(12) United States Patent
Nakamura

(10) Patent No.: US 11,970,311 B2
(45) Date of Patent: Apr. 30, 2024

(54) SYNTHETIC-RESIN CONTAINER LID, METHOD FOR MANUFACTURING SAME, AND POST-PROCESSING APPARATUS FOR EXECUTING THE METHOD

(71) Applicant: NIPPON CLOSURES CO., LTD., Tokyo (JP)

(72) Inventor: Shin Nakamura, Kanagawa (JP)

(73) Assignee: NIPPON CLOSURES CO., LTD., Tokyo (JP)

( * ) Notice: Subject to any disclaimer, the term of this patent is extended or adjusted under 35 U.S.C. 154(b) by 17 days.

(21) Appl. No.: 17/801,429

(22) PCT Filed: Feb. 12, 2021

(86) PCT No.: PCT/JP2021/005178
§ 371 (c)(1),
(2) Date: Aug. 22, 2022

(87) PCT Pub. No.: WO2021/172043
PCT Pub. Date: Sep. 2, 2021

(65) Prior Publication Data
US 2023/0098984 A1 Mar. 30, 2023

(30) Foreign Application Priority Data

Feb. 25, 2020 (JP) ................................ 2020-029028

(51) Int. Cl.
| | | |
|---|---|---|
| B65D 41/34 | (2006.01) | |
| B29C 70/54 | (2006.01) | |
| B29D 99/00 | (2010.01) | |
| B65D 55/16 | (2006.01) | |
| B29K 23/00 | (2006.01) | |

(52) U.S. Cl.
CPC ........ B65D 41/3428 (2013.01); B29C 70/545 (2013.01); B29D 99/0096 (2013.01);
(Continued)

(58) Field of Classification Search
CPC ............ B65D 41/3409; B65D 41/3428; B65D 41/3447; B65D 43/169; B65D 55/16;
(Continued)

(56) References Cited

U.S. PATENT DOCUMENTS

| | | | | |
|---|---|---|---|---|
| 4,494,664 A | * | 1/1985 | Guala ................ | B65D 41/3409 215/258 |
| 4,784,281 A | * | 11/1988 | Rozenberg ......... | B65D 41/3409 215/252 |

(Continued)

FOREIGN PATENT DOCUMENTS

| | | | |
|---|---|---|---|
| CN | 1631741 A | * | 6/2005 |
| CN | 1830730 | | 9/2006 |

(Continued)

OTHER PUBLICATIONS

International Search Report (ISR) dated Apr. 13, 2021 in International (PCT) Application No. PCT/JP2021/005178.

*Primary Examiner* — Chun Hoi Cheung
*Assistant Examiner* — Brijesh V. Patel
(74) *Attorney, Agent, or Firm* — WENDEROTH, LIND & PONACK, L.L.P.

(57) ABSTRACT

A synthetic-resin container lid having tamper-evident characteristics, which is not separated in its entirety from a mouth-neck portion of a container even after the mouth-neck portion of the container is unsealed, is manufactured rapidly and inexpensively. A plurality of scores (26, 30, 32, 34, 36, 38) are formed, as post-processing, at predetermined positions in an incomplete container lid formed with no scores.

10 Claims, 6 Drawing Sheets

(52) U.S. Cl.
CPC .......... *B65D 55/16* (2013.01); *B29K 2023/06* (2013.01); *B29K 2023/12* (2013.01)

(58) Field of Classification Search
CPC ........ B65D 2251/10; B65D 2251/1008; B65D 2401/30; B65D 2401/35; B29C 70/545; B29D 99/0096; B29K 2023/06; B29K 2023/12; B26D 1/0006; B26D 1/03; B26D 2001/0033; B26D 2001/006; B26F 1/18; B26F 2210/04
USPC ....... 215/235, 243, 252–254, 258, 272, 306; 220/263, 268, 288, 375, 810, 832, 220/836–837, 847
See application file for complete search history.

(56) References Cited

U.S. PATENT DOCUMENTS

| | | | |
|---|---|---|---|
| 5,295,600 A * | 3/1994 | Kowal | B65D 41/3428 215/252 |
| 8,469,213 B2 * | 6/2013 | Ishii | B65D 55/16 220/837 |
| 2013/0001185 A1 * | 1/2013 | Antier | B65D 55/16 215/253 |
| 2016/0288961 A1 | 10/2016 | Maguire | |
| 2017/0203896 A1 | 7/2017 | Maguire | |
| 2017/0362003 A1 | 12/2017 | Maguire | |
| 2018/0079570 A1 | 3/2018 | Maguire | |
| 2018/0370701 A1 | 12/2018 | Maguire | |
| 2019/0344933 A1 * | 11/2019 | Kim | B65D 41/0414 |
| 2019/0344944 A1 | 11/2019 | Maguire | |
| 2020/0115115 A1 * | 4/2020 | Migas | B65D 55/16 |
| 2020/0399036 A1 * | 12/2020 | Dai | B65D 41/325 |
| 2021/0094733 A1 * | 4/2021 | Bloom | B65D 41/3442 |
| 2021/0171257 A1 * | 6/2021 | Melan-Moutet | B65D 41/3428 |

FOREIGN PATENT DOCUMENTS

| | | |
|---|---|---|
| JP | 2011-111193 | 6/2011 |
| JP | 2012201380 A * | 10/2012 |
| JP | 5330921 B2 * | 10/2013 |
| JP | 2014-31202 | 2/2014 |
| JP | 2018-510825 | 4/2018 |
| WO | 2016/160591 | 10/2016 |

* cited by examiner

SYNTHETIC-RESIN CONTAINER LID, METHOD FOR MANUFACTURING SAME, AND POST-PROCESSING APPARATUS FOR EXECUTING THE METHOD

TECHNICAL FIELD

This invention relates to a synthetic-resin container lid having tamper-evident characteristics, the container lid being one which is applied to a container formed with an external thread on an outer peripheral surface of a mouth-neck portion, and a locking jaw section located below the external thread, and which is not separated, in its entirety, from the mouth-neck portion of the container even after the mouth-neck portion of the container is unsealed; a method for manufacturing the container lid; and a post-processing apparatus for executing this method.

BACKGROUND ART

As a synthetic-resin container lid which is applied to a container formed with an external thread, and a locking jaw section located below the external thread, on an outer peripheral surface of a mouth-neck portion, Patent Document 1 to be described below discloses a synthetic-resin container lid of a form including a body having a top panel wall, and a cylindrical skirt wall extending downward from the peripheral edge of the top panel wall, wherein an internal thread to be screwed to the external thread of the mouth-neck portion is formed on an inner peripheral surface of the skirt wall; and a cylindrical tamper-evident bottom portion which is connected to the skirt wall of the body via a plurality of breaking bridge sections disposed at intervals in a circumferential direction, and which has an inner peripheral surface where locking means to be locked to the locking jaw section is disposed. A protrusion piece protruding downward is disposed on the skirt wall of the body. On both sides in the circumferential direction of the protrusion piece, non-breaking connection pieces, which connect the skirt wall of the body and the tamper-evident bottom portion together and allow the upward movement of the body with respect to the tamper-evident bottom portion, are disposed.

When the container lid described above is mounted on the mouth-neck portion of the container to seal the mouth-neck portion, the container lid is fitted to the mouth-neck portion and rotated in a closing direction to screw the internal thread of the container lid to the external thread of the mouth-neck portion. As the screwing proceeds, the container lid is lowered relative to the mouth-neck portion. The locking means formed in the tamper-evident bottom portion elastically climbs over the locking jaw section of the mouth-neck portion to settle below it. In unsealing the mouth-neck portion, the container lid is rotated in an opening direction to release the screwing of the external thread of the mouth-neck portion and the internal thread of the container lid. In accordance with the release of the screwing, the body of the container lid is raised with respect to the mouth-neck portion, whereas the tamper-evident bottom portion is inhibited from ascending, because the locking means is locked to the locking jaw section of the mouth-neck portion. Hence, stress is generated in the breaking bridge sections, whereby the breaking bridge sections are broken. After breakage of the breaking bridge sections, the body continues to ascend, and the body is finally spaced upward from the tamper-evident bottom portion. Accordingly, the non-breaking connection piece is deformed, but the non-breaking connection piece is free from breakage. The tamper-evident bottom portion continues to be mounted on the mouth-neck portion. Even after the body is removed from the mouth-neck portion, the body is kept connected to the tamper-evident bottom portion via the non-breaking connection piece, and is thus not separated from the mouth-neck portion of the container. After the body of the container lid is removed from the mouth-neck portion, the body of the container lid is turned in a direction away from the mouth-neck portion, with a predetermined site of the non-breaking connection piece as the center of turn. When the body of the container lid is turned beyond a predetermined angle, a leading end part of the protrusion piece formed in the skirt wall elastically climbs over the locking jaw section of the mouth-neck portion, and lies on the upper surface side of the locking jaw section. Consequently, the body is inhibited from returning to a direction toward the mouth-neck portion. As a result, the body is held at a position spaced from the mouth-neck portion, and the mouth-neck portion is maintained in an unsealed state.

PRIOR ART DOCUMENTS

Patent Documents

Patent Document 1: JP-A-2014-31202

SUMMARY OF THE INVENTION

Problems to be Solved by the Invention

A synthetic-resin container lid having a body and a tamper-evident bottom portion connected together via non-breaking connection pieces, as described above, is usually formed by injection molding using a plurality of split molds, because its shape is relatively complicated. When the container lid of a complicated shape is injection molded using the plurality of split molds, flow paths defined by the plurality of split molds are so complicated that the flowability of a molten resin in the flow paths declines, thus requiring a considerable time for molding. The mold for performing injection molding is also complicated, increasing the cost of manufacturing.

The present invention has been accomplished in the light of the above facts. Its main technical challenge is to manufacture a synthetic-resin container lid having tamper-evident characteristics with rapidity and at a low cost, the container lid which is not separated, in its entirety, from a mouth-neck portion of a container even after the mouth-neck portion of the container is unsealed.

Means for Solving the Problems

The present inventors have conducted in-depth studies, and found that the above-described main technical challenge can be solved by forming a plurality of scores at predetermined positions, as a post-processing measure, in an incomplete container lid without formation of any scores.

According to the present invention, there is provided, as a container lid for solving the above main technical challenge, a synthetic-resin container lid which is applied to a container formed with an external thread, and a locking jaw section located below the external thread, on an outer peripheral surface of a mouth-neck portion, the synthetic-resin container lid comprising: a body having a top panel wall, and a cylindrical skirt wall extending downward from the peripheral edge of the top panel wall, an inner peripheral surface of the skirt wall being formed with an internal thread to be screwed to the external thread; and a cylindrical tamper-evident bottom portion which is connected to the skirt wall via a breakable line extending in a circumferential direction, and which has an inner peripheral surface where locking means to be locked to the locking jaw section is disposed, wherein the breakable line is defined by forming a plurality of first scores extending in the circumferential direction at intervals in the circumferential direction, or by forming a groove continuously in the circumferential direction to reduce a residual thickness, except for a specific region extending in the circumferential direction, a pair of second scores extending in the circumferential direction at an interval in the circumferential direction in a lower part of the skirt wall; a pair of third scores extending in the circumferential direction at an interval in the circumferential direction in an upper part of the tamper-evident bottom portion; a pair of fourth scores extending in the circumferential direction at an interval in the circumferential direction in the tamper-evident bottom portion axially below the third scores; and a fifth score extending in the circumferential direction in the tamper-evident bottom portion axially below the third scores are formed in the specific region, and an inner end of each of the third scores is located circumferentially outside an inner end of each of the second scores; an outer end of each of the third scores is located circumferentially outside an outer end of each of the second scores; an inner end of each of the fourth scores is located circumferentially inside the inner end of each of the third scores; and each of both ends of the fifth score is located in alignment with, or circumferentially outside, the inner end of each of the second scores and the inner end of each of the fourth scores, and a pair of sixth scores extending in an axial direction is further formed in the specific region, the sixth scores connecting inner end parts of each of the second scores, inner end parts of the fourth scores, and both end parts of the fifth score.

Preferably, the breakable line is defined by forming the plurality of first scores extending in the circumferential direction at intervals in the circumferential direction, except for the specific region. Suitably, the fifth score is located axially below the fourth scores. In this case, it is advisable that the inner end of each of the second scores and the inner end of each of the fourth scores be located in alignment, and that each of the both ends of the fifth score be located circumferentially outside the inner end of each of the second scores and the inner end of each of the fourth scores. Preferably, each of the third scores is located in axial alignment with the breakable line, and the outer end of each of the third scores is directly connected to the breakable line. It is preferred that seventh scores extending axially, which connect outer end parts of each of the third scores to the breakable line, be further formed in the specific region.

As a method for manufacturing the synthetic-resin container lid configured in accordance with the present invention, moreover, there is provided a method comprising:

an incomplete container lid molding step of compression molding or injection molding an incomplete container lid of a shape having none of the breakable line, the second scores, the third scores, the fourth scores, the fifth score, and the sixth scores formed therein; and a post-processing step of applying cutting blades to the incomplete container lid, after the incomplete container lid molding step, to form the breakable line, the second scores, the third scores, the fourth scores, the fifth score, and the sixth scores.

In this case, it is preferred that in the post-processing step, the incomplete container lid be allowed to revolve around an arcuate cutting tool, while rotating on its axis, along an outer peripheral edge or an inner peripheral edge of the arcuate cutting tool having the cutting blades arranged on the outer peripheral edge or the inner peripheral edge.

As a processing device for performing the above-described method, moreover, there is provided a post-processing apparatus, comprising:

a first cutting tool constituted by a stack of a first cutting blade of an arcuate plate shape for forming the breakable line; a second cutting blade of an arcuate plate shape for forming the second scores; a third cutting blade of an arcuate plate shape for forming the third scores; a fourth cutting blade of an arcuate plate shape for forming the fourth scores; and a fifth cutting blade of an arcuate plate shape for forming the fifth score; and a second cutting tool having sixth cutting blades arranged therein for forming the sixth scores, wherein the first cutting tool and the second cutting tool are connected together in a circumferential direction.

In this case, seventh cutting blades for forming the seventh scores can also be arranged in the second cutting tool.

Effects of the Invention

In the synthetic-resin container lid of the present invention, the breakable line, the second scores, the third scores, the fourth scores, the fifth score, and the sixth scores are formed respectively at predetermined positions. Thus, even after the mouth-neck portion of the container is unsealed, the whole of the container lid is not separated from the mouth-neck portion of the container, and the connection of the body and the tamper-evident bottom portion is maintained. The foregoing synthetic-resin container lid of the present invention can be manufactured by initially molding an incomplete container lid of a relatively simple shape, and then forming, as post-processing, the breakable line, the second scores, the third scores, the fourth scores, the fifth score, and the sixth scores at required positions of the incomplete container lid. Since its shape is relatively simple, the incomplete container lid can be molded by compression molding as well as injection molding. Compression molding is capable of rapid molding as compared with injection molding. If the incomplete container lid is molded by compression molding, therefore, the synthetic-resin container lid of the present invention is manufactured very rapidly. Even when the incomplete container lid is molded by injection molding, the synthetic-resin container lid of the present invention is manufactured comparatively rapidly, because the structure of the incomplete container lid is itself relatively simple, so that the fluidity of the molten resin does not lower. Whichever of the molding methods is used to mold the incomplete container lid, moreover, the mold of a relatively simple shape is adopted. Hence, the manufacturing cost of the mold is curtailed, and eventually the manufacturing cost of the container lid is reduced.

MODE FOR CARRYING OUT THE INVENTION

Preferred embodiments of a synthetic-resin container lid configured in accordance with the present invention, a method for manufacturing the container lid, and a processing device for executing this method will be described in more detail by reference to the accompanying drawings.

Figure 1:
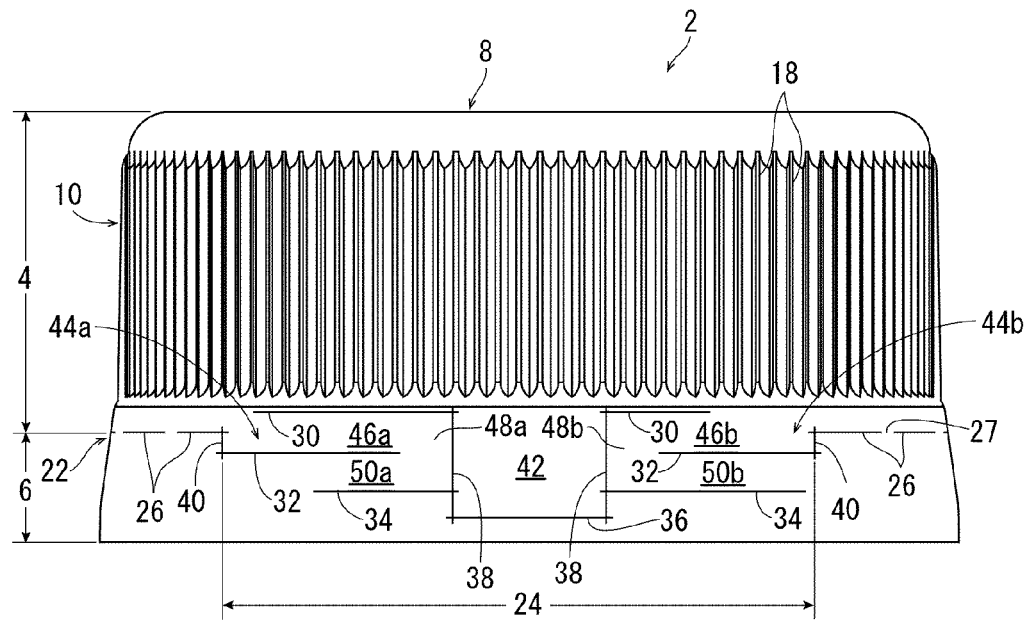
FIG. 1 is a front view showing a preferred embodiment of a container lid configured in accordance with the present invention.
Figure 2:
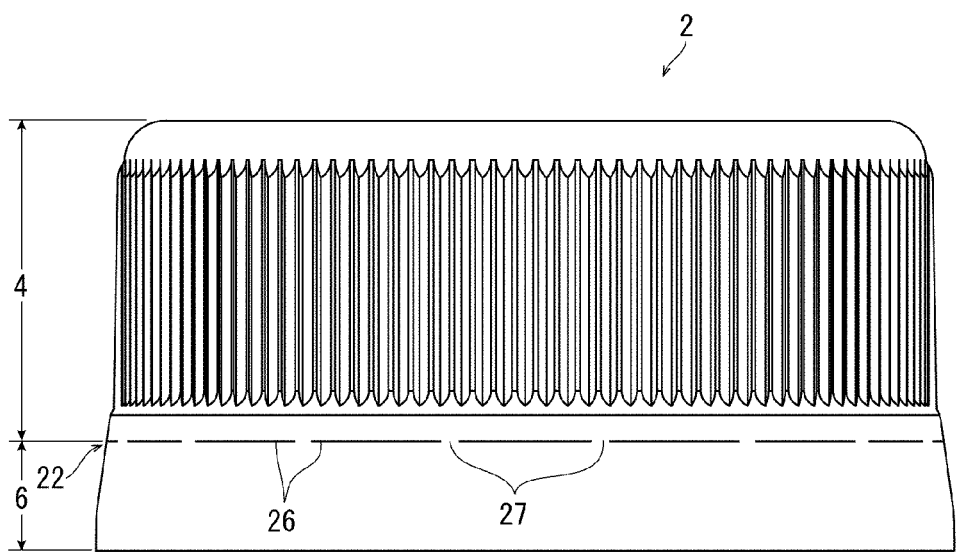
FIG. 2 is a rear view of the container lid shown in FIG. 1.
Figure 3:
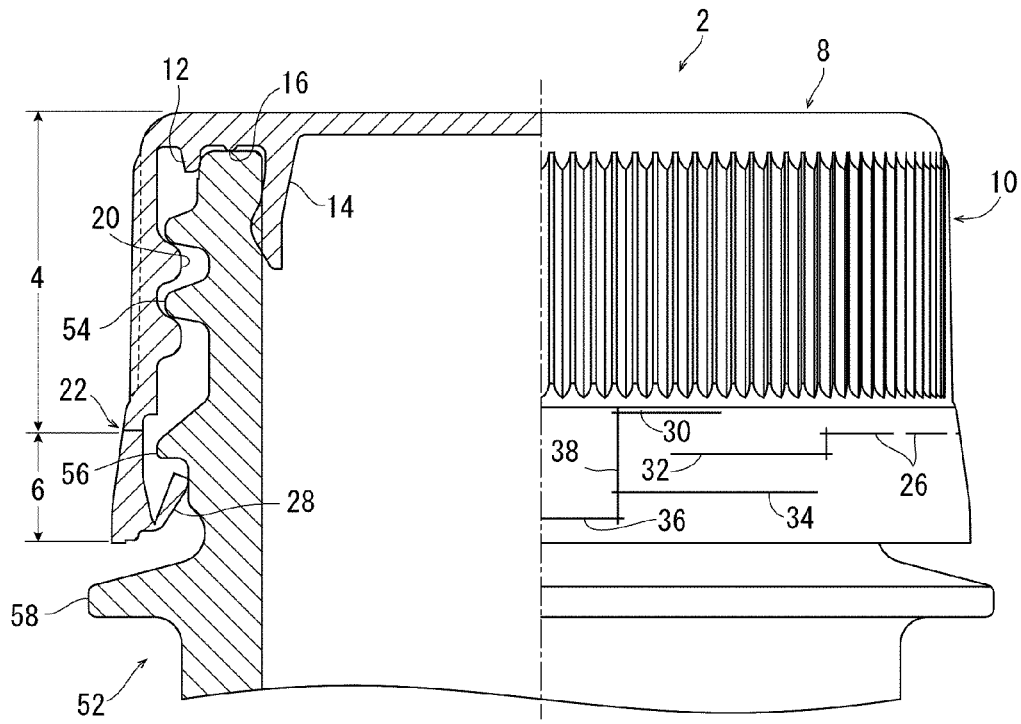
FIG. 3 is a front view, partly in section, of the container lid shown in FIG. 1.

First, a synthetic-resin container lid configured in accordance with the present invention will be described. Referring to FIGS. 1 to 3, a container lid indicated entirely at 2, which can advantageously be integrally molded by injection molding or compression molding from a suitable synthetic resin such as polyethylene or polypropylene, includes a body 4 and a tamper-evident bottom portion 6. The body 4 has a circular top panel wall 8, and a cylindrical skirt wall 10 suspending downward from the peripheral edge of the top panel wall 8. On the inner surface of the top panel wall 8, two sealing pieces, i.e., an outer annular sealing piece 12 and an inner annular sealing piece 14, are formed. Between the outer annular sealing piece 12 and the inner annular sealing piece 14 is also formed a toroidal tiny ridge 16 projecting downward from the inner surface of the top panel wall 8. The outer peripheral surface of the skirt wall 10 is repeatedly formed with irregularities 18 for preventing the slippage of fingers to be engaged therewith. The inner peripheral surface of the skirt wall 10 is formed with an internal thread 20. The tamper-evident bottom portion 6 is in a cylindrical shape as a whole, and is connected to the skirt wall 10 of the body 4 via a breakable line 22 extending in a circumferential direction. The breakable line 22 is defined by forming a plurality of first scores 26 extending in the circumferential direction at intervals in the circumferential direction, except for a specific region 24 extending in the circumferential direction. Parts of the breakable line 22, where the first scores 26 are not formed, are indicated at 27 as residual parts. If desired, the breakable line 22 may be defined by forming a groove continuously in the circumferential direction to reduce the residual thickness. On the inner peripheral surface of the tamper-evident bottom portion 6, locking means is disposed. In the illustrated embodiment, the locking means is composed of a plurality of arcuate locking pieces 28 formed at intervals in the circumferential direction. Each of the plurality of arcuate locking pieces 28 is extended out axially upwardly and radially inwardly from a base end thereof connected to the inner peripheral surface of the tamper-evident bottom portion 6. In the illustrated embodiment, the locking means is constituted by the plurality of arcuate locking pieces 28 arranged at intervals in the circumferential direction. If desired, however, the locking means may be composed of an annular locking piece which extends continuously in the circumferential direction and which extends out axially upwardly and radially inwardly from the base end connected to the inner peripheral surface of the tamper-evident bottom portion 6.

By reference to FIG. 1, in the specific region 24, there are formed a pair of second scores 30 extending in the circumferential direction at intervals in the circumferential direction in a lower part of the skirt wall 10; a pair of third scores 32 extending in the circumferential direction at intervals in the circumferential direction in an upper part of the tamper-evident bottom portion 6; a pair of fourth scores 34 extending in the circumferential direction at intervals in the circumferential direction in the tamper-evident bottom portion 6 axially below the third scores 32; and a fifth score 36 extending in the circumferential direction in the tamper-evident bottom portion 6 axially below the third scores 32. In the illustrated embodiment, the fifth score 36 is located axially below the fourth scores 34. Instead, however, the fifth score 36 may be disposed between the third scores 32 and the fourth scores 34 as viewed in the axial direction, and the inner ends of the pair of fourth scores 34 may be connected together. The second scores 30, the third scores 32, the fourth scores 34, and the fifth score 36 each extend circumferentially linearly and substantially horizontally. One of the pair of second scores 30 is circumferentially longer than the other; the other of the paired fourth scores 34 is circumferentially longer than one of them; and the circumferential length of each of the paired third scores 32 is the same. The reasons for these lengths will be described later. Furthermore, the inner end of each of the third scores 32 is located circumferentially outside the inner end of each of the second scores 30; the outer end of each of the third scores 32 is located circumferentially outside the outer end of each of the second scores 30; the inner end of each of the fourth scores 34 is located circumferentially inside the inner end of each of the third scores 32; and each of both ends of the fifth score 36 is located circumferentially outside the inner end of each of the second scores 30 and the inner end of each of the fourth scores 34. If desired, each of both ends of the fifth score 36 may be located in alignment with the inner end of each of the second scores 30 and the inner end of each of the fourth scores 34.

In the specific region 24, there is further formed a pair of sixth scores 38 extending in the axial direction and connecting inner end parts of each of the second scores 30, inner end parts of the fourth scores 34, and both end parts of the fifth score 36. In the illustrated embodiment, the inner end of each of the second scores 30 and the inner end of each of the fourth scores 34 are located in alignment; each of both ends of the fifth score 36 is located circumferentially outside the inner end of each of the second scores 30 and the inner end of each of the fourth scores 34; and the sixth scores 38 extend linearly in the axial direction.

In the specific region 24, axially extending seventh scores 40 are further formed which connect outer end parts of each of the third scores 32 to the breakable line 22. In the illustrated embodiment, the outer end of each of the third scores 32 is located circumferentially outside each of both ends of the breakable line 22, and the seventh scores 40 extend linearly in the axial direction. If desired, the outer end of each of the third scores 32 may be located in alignment with each of both ends of the breakable line 22. Furthermore, each of the third scores 32 may be located in axial alignment with the breakable line 22 so that the outer end of each of the third scores 32 can be directly connected to the breakable line 22. In other words, each of the third scores 32 is located in axial alignment with the breakable line 22, whereby both ends of the third scores 32 can be directly connected to the breakable line 22, without the intermediary of the seventh scores 40.

With further reference to FIG. 1, by forming the above-described scores, respectively, in the specific region 24, a protrusion piece 42 and a pair of non-breaking connection pieces 44a and 44b are defined in the specific region 24. The protrusion piece 42 is defined by the fifth score 36 and the sixth scores 38, and protrudes linearly downward from the lower end of the skirt wall 10.

Each of the pair of non-breaking connection pieces 44a and 44b is defined by the second score 30, the third score 32, the fourth score 34, and the sixth score 38, and the paired non-breaking connection pieces 44a and 44b are located adjacent to both sides in the circumferential direction of the protrusion piece 42. The non-breaking connection piece 44a in the illustrated embodiment is composed of a first tilt part 46a connected to the lower edge of the skirt wall 10 and extending substantially horizontally to one side in the circumferential direction (to the right side in FIG. 1); an intermediate part 48a; and a second tilt part 50a continued from the intermediate part 48a, extending substantially horizontally to the other side in the circumferential direction (to the left side in FIG. 1) below the first tilt part 46a, and connected to the tamper-evident bottom portion 6. In the state shown in FIG. 1, the upper side of the first tilt part 46a is defined by the second score 30, while its lower side is defined by the third score 32. The intermediate part 48a is defined by a circumferential one end part (right end part in the drawing) of the second score 30 and the fourth score 34, and the sixth score 38, and has its upper section connected to the circumferential one end of the first tilt part 46a, and has its lower section connected to the circumferential one end of the second tilt part 50a. The upper side of the second tilt part 50a is defined by the third score 32, while its lower side is defined by the fourth score 34. The non-breaking connection piece 44b is also composed of a first tilt part 46b connected to the lower edge of the skirt wall 10 and extending substantially horizontally to one side in the circumferential direction (to the left side in FIG. 1); an intermediate part 48b; and a second tilt part 50b continued from the intermediate part 48b, extending substantially horizontally to the other side in the circumferential direction (to the right side in FIG. 1) below the first tilt part 46b, and connected to the tamper-evident bottom portion 6. In the state shown in FIG. 1, the upper side of the first tilt part 46b is defined by the second score 30, while its lower side is defined by the third score 32. The intermediate part 48b is defined by a circumferential opposite end part (left end part in the drawing) of the second score 30, and the fourth score 34, and the sixth score 38, and has its upper section connected to the circumferential opposite end of the first tilt part 46b, and has its lower section connected to the circumferential opposite end of the second tilt part 46b. The upper side of the second tilt part 50b is defined by the third score 32, while its lower side is defined by the fourth score 34. As will be clearly understood by referring to FIG. 1, the non-breaking connection piece 44a and the non-breaking connection piece 44b are not in line symmetry, and the circumferential dimensions of their components are somewhat different (in regard to reason for this difference, reference is requested to the descriptions of JP-A-2012-76771 whose patent application was filed previously by the applicant of the present application).

The container lid 2 as described above is manufactured in the following manner: First, an incomplete container lid (not shown) of a shape without the formation of the breakable line 22, the second scores 30, the third scores 32, the fourth scores 34, the fifth score 36, and the sixth scores 38 is compression molded or injection molded (incomplete container lid molding step). Then, cutting blades are allowed to act on the incomplete container lid to form the breakable line 22, the second scores 30, the third scores 32, the fourth scores 34, the fifth score 36, and the sixth scores 38 (post-processing step). In the illustrated embodiment, the seventh scores are also formed in the container lid 2. The seventh scores 40 are not formed in the incomplete container lid molding step, but formed in the post-processing step. In the post-processing step, the incomplete container lid is allowed to revolve around an arcuate cutting tool, while rotating on its own axis, along an outer peripheral edge or an inner peripheral edge of the arcuate cutting tool having cutting blades disposed on the outer peripheral edge or the inner peripheral edge, whereby the above respective scores are formed. The cutting blades and the arcuate cutting tool having them disposed therein, described above, will be further mentioned later.

FIG. 3 illustrates a mouth-neck portion 52 of a container along with the container lid 2. The mouth-neck portion 52 of the container, which can be formed from a suitable synthetic resin such as polyethylene terephthalate, or glass, is in a cylindrical shape as a whole, and is open at its upper surface. The outer peripheral surface of the mouth-neck portion 52 is formed with an external thread 54, and a locking jaw section 56 located below the external thread 54. Below the locking jaw section 56, a known support ring 58 is also formed.

In mounting the container lid 2 on the mouth-neck portion 52 to seal the mouth-neck portion 52, the container lid 2 is fitted to the mouth-neck portion 52 and rotated in a closing direction (clockwise in FIG. 3 when viewed from above) to screw the internal thread 20 of the container lid 2 to the external thread 54 of the mouth-neck portion 52. As the screwing of the internal thread 20 to the external thread 54 proceeds, the container lid 2 is gradually lowered relative to the mouth-neck portion 52. Once the container lid 2 is lowered relative to the mouth-neck portion 52 up to the state illustrated in FIG. 3, the outer annular sealing piece 12 and the inner annular sealing piece 14 formed on the inner surface of the top panel wall 8 in the body 4 of the container lid 2 are brought into intimate contact with the inner peripheral surface and the outer peripheral surface, respectively, of the mouth-neck portion 52, and the tiny ridge 16 abuts on the top surface of the mouth-neck portion 52, thereby sealing the mouth-neck portion 52. Each of the plurality of arcuate locking pieces 28 arranged on the inner peripheral surface of the tamper-evident bottom portion 6 of the container lid 2 is elastically deformed, and located below the locking jaw section 56 of the mouth-neck portion 52.

Figure 4:
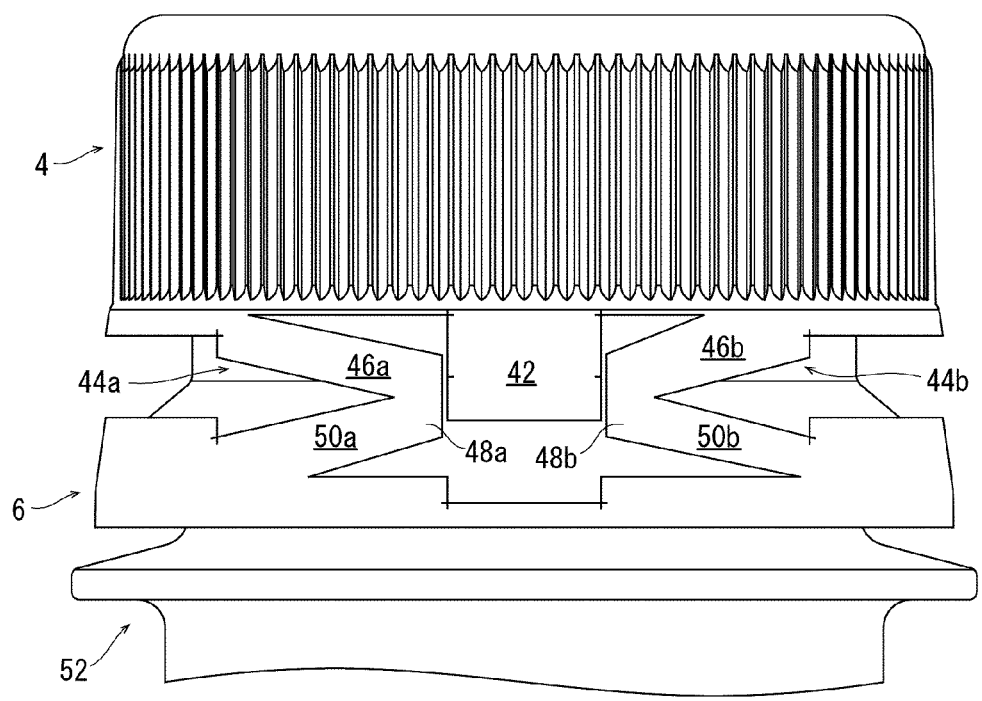
FIG. 4 is a front view showing the intermediate state of an unsealing operation for rotating a body of the container lid of FIG. 1 in an opening direction to raise the body, in order to remove the body from a mouth-neck portion of a container.

In unsealing the mouth-neck portion 52, the container lid 2 is rotated in an opening direction (counterclockwise in FIG. 3 when viewed from above) to gradually release the screwing of the internal thread 20 of the container lid 2 to the external thread 54 of the mouth-neck portion 52. As the screwing is gradually released, the body 4 of the container lid 2 is rotated in the opening direction and raised. On the other hand, the tamper-evident bottom portion 6 is inhibited from ascending, because the upper surfaces of the arcuate locking pieces 28 are locked to the lower surface of the locking jaw section 56 of the mouth-neck portion 52. Hence, considerable stress is generated in the residual parts 27 of the breakable line 22, whereby the residual parts 27 are broken. Afterwards, the body 4 of the container lid 2 is raised while being rotated in the opening direction, and gradually spaced upward from the tamper-evident bottom portion 6. As will be understood by reference to FIG. 4 along with FIGS. 1 and 3, when the body 4 is gradually spaced upward from the tamper-evident bottom portion 6, the first tilt part 46*a* of the non-breaking connection piece 44*a* and the second tilt part 50*b* of the non-breaking connection piece 44*b* are turned clockwise, namely tilted clockwise, in FIGS. 3 and 4 around the intermediate part 48*a* and the lower end of the second tilt part 50*b*. On the other hand, the second tilt part 50*a* of the non-breaking connection piece 44*a* and the first tilt part 46*b* of the non-breaking connection piece 44*b* are turned counterclockwise, namely tilted counterclockwise, in FIGS. 3 and 4 around the lower end and the upper end thereof, respectively. In accordance with these motions, the inclination angles, with respect to the vertical lines, of the first tilt parts 46*a* and 46*b* and the second tilt parts 50*a* and 50*b* of the non-breaking connection pieces 44*a* and 44*b* are gradually decreased. When the screwing of the internal thread 20 of the container lid 2 to the external thread 54 of the mouth-neck portion 52 is completely released, the body 4 of the container lid 2 is removed from the mouth-neck portion 52. However, the body 4 continues to be connected to the tamper-evident bottom portion 6, which continues to be mounted on the mouth-neck portion 52, via the non-breaking connection pieces 44*a* and 44*b*, and is thus not spaced from the mouth-neck portion 52 of the container.

Figure 5:
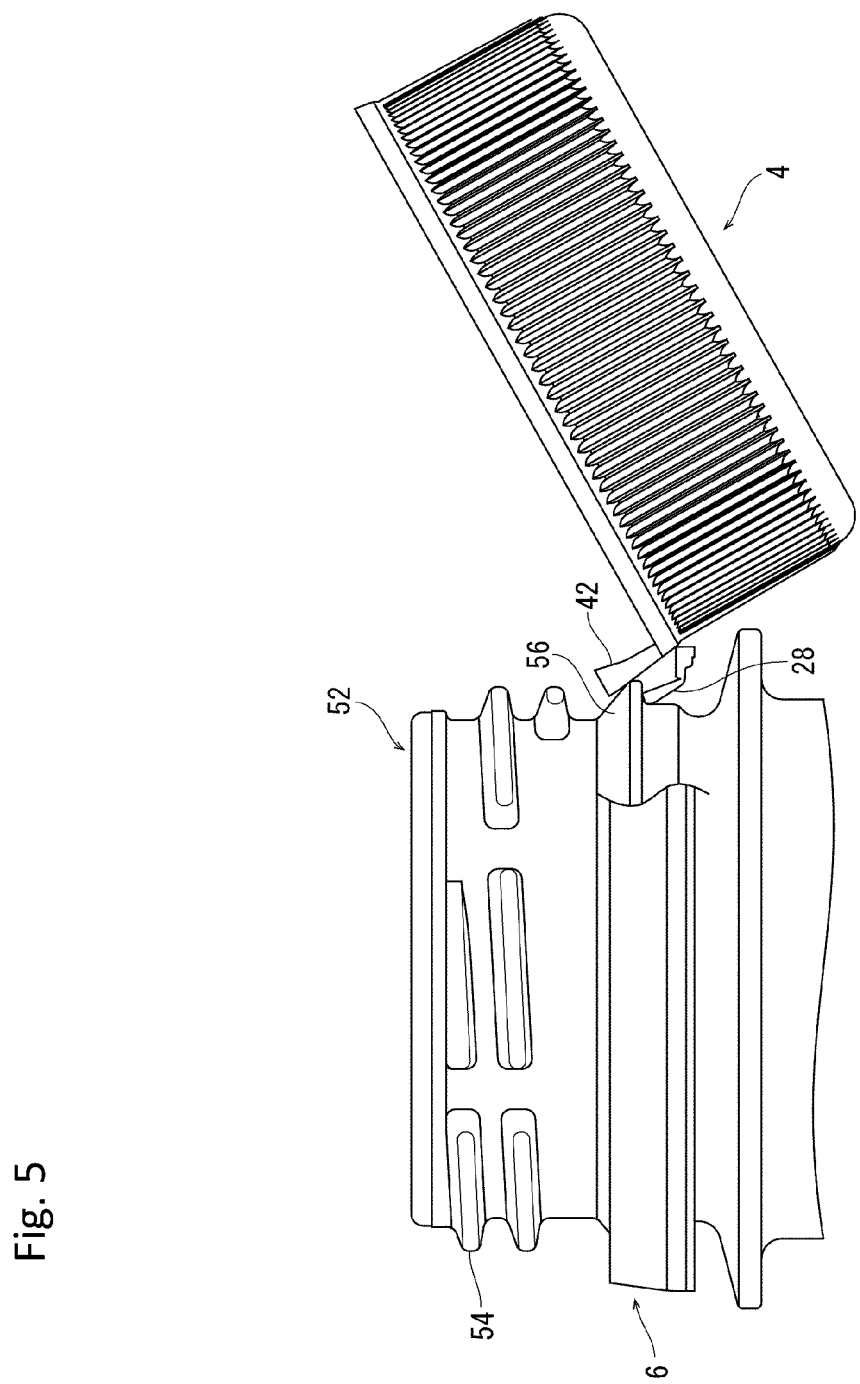
FIG. 5 is a side view, partly in section, showing a state in which the body of the container lid of FIG. 1 is turned to a predetermined opening position in a direction away from the mouth-neck portion of the container, after the body is removed from the mouth-neck portion.

After the body 4 of the container lid 2 is removed from the mouth-neck portion 52, the body 4 is turned in a direction away from the mouth-neck portion 52 up to a state as illustrated in FIG. 5, with the intermediate parts 48*a* and 48*b* of the non-breaking connection pieces 44*a* and 44*b* as turning fulcrums. By so doing, the outer surface of a lower end part (front end part) of the protrusion piece 42 formed in the body 4 abuts on the upper surface of the locking jaw section 56 of the mouth-neck portion 52, and the lower end of the skirt wall 10 of the body 4 abuts on or comes in proximity to the outer peripheral surface of the tamper-evident bottom portion 6, whereby the body 4 is releasably held at the position illustrated in FIG. 5. Hence, a consumer can drink or eat the contents present in the container, such as a soft drink, without being impeded by the presence of the body 4.

If the drinking or eating of the contents is interrupted midway, the body 4 held at the position illustrated in FIG. 5 is forcibly turned in a direction toward the mouth-neck portion 52 (counterclockwise in FIG. 5) and fitted to the mouth-neck portion 52 again. Then, the container lid 2 is rotated in the closing direction to screw the internal thread 20 of the container lid 2 to the external thread 54 of the mouth-neck portion 52. In this manner, the container lid 2 is positioned in the state illustrated in FIG. 3 again, so that the mouth-neck portion 52 can be provisionally sealed.

Next, a description will be offered for a device which is one for manufacturing the container lid 2 and is a post-processing apparatus for executing the above-described post-processing step.

Figure 6:
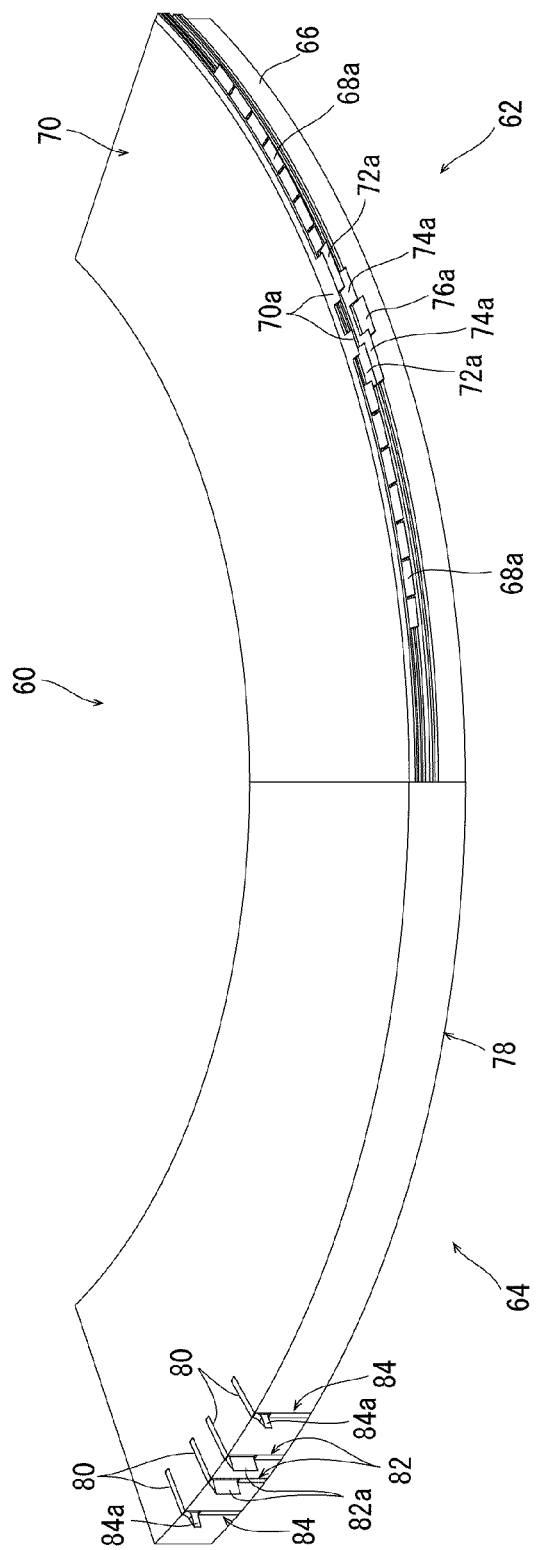
FIG. 6 is a perspective view showing a post-processing apparatus for manufacturing the container lid shown in FIG. 1.
Figure 7:
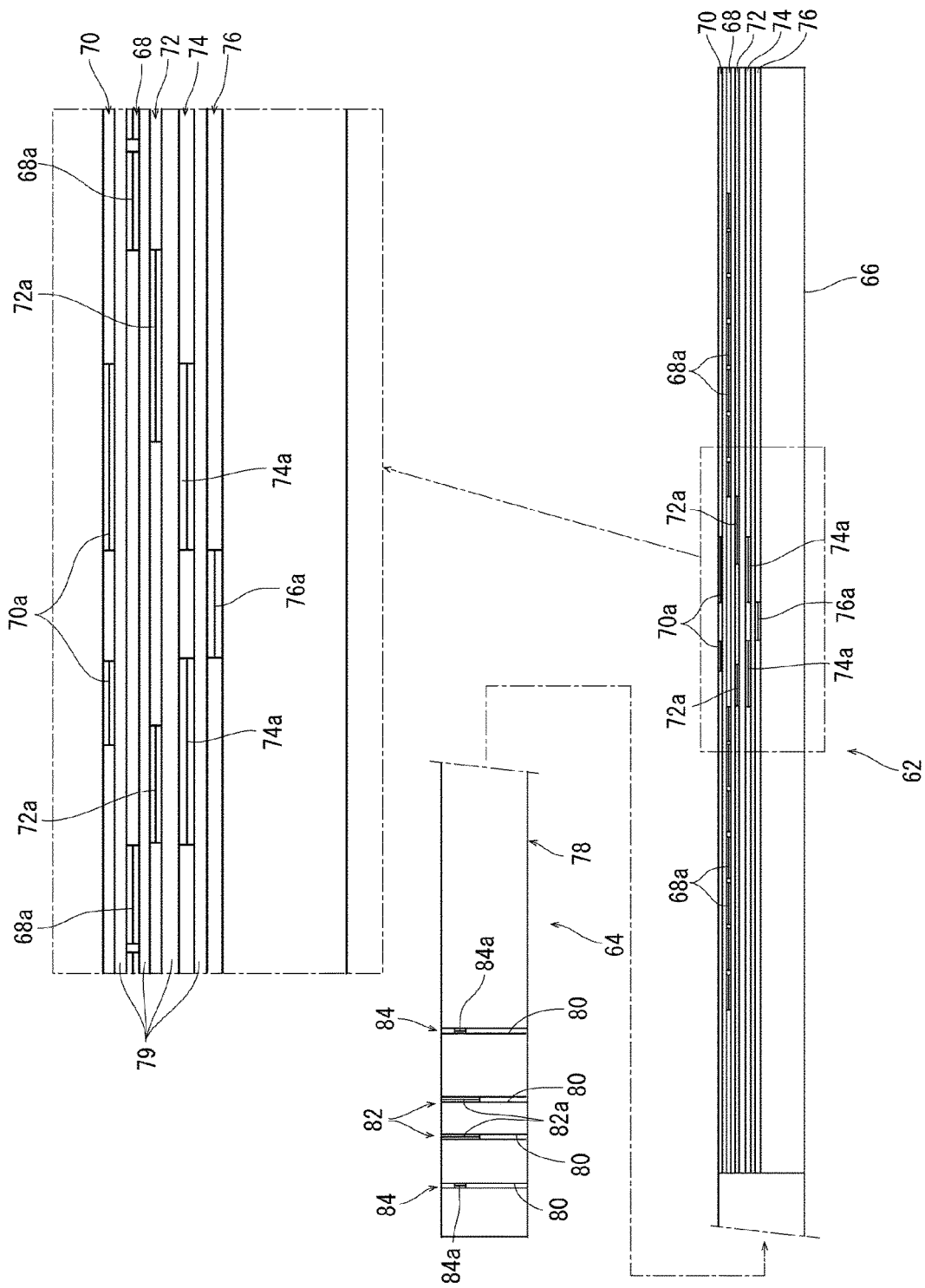
FIG. 7 is a front view, as a development plan, showing the post-processing apparatus shown in FIG. 6.

By reference to FIGS. 6 and 7, a post-processing apparatus entirely indicated at 60 includes a first cutting tool 62, and a second cutting tool 64. The first cutting tool 62 is equipped with a first support member 66 shaped like an arcuate plate. On the upper surface of the first support member 66, a first cutting blade 68 of an arcuate plate shape for forming the breakable line 22; a second cutting blade 70 of an arcuate plate shape for forming the second scores 30; a third cutting blade 72 of an arcuate plate shape for forming the third scores 32; a fourth cutting blade 74 of an arcuate plate shape for forming the fourth scores 34; and a fifth cutting blade 76 of an arcuate plate shape for forming the fifth score 36 are stacked, and fixed by a suitable fixing method. In circumferential required regions of the first cutting blade 68 to the fifth cutting blade 76, working parts (indicated with "a" attached to the end of the numeral representing each cutting blade), which protrude diametrically outwardly and whose leading ends are sharp, are formed continuously in the circumferential direction. The first cutting tool 62 further includes auxiliary plates 79 each of an arcuate plate shape (see FIG. 7) for making the first cutting blade 68 to the fifth cutting blade 76 arranged at required positions in the axial direction. The auxiliary plates 79 are stacked together with the first cutting blade 68 to the fifth cutting blade 76.

The second cutting tool 64 is equipped with a second support member 78 shaped like an arcuate plate. At required positions in the circumferential direction of the outer peripheral surface of the second support member 78, a plurality of grooves 80 (four grooves in the illustrated embodiment) extending axially linearly are formed. The plurality of grooves 80 are, respectively, fitted with sixth cutting blades 82 for forming the sixth scores 38, and seventh cutting blades 84 for forming the seventh scores 40, and these cutting blades are fixed by a suitable method. Therefore, the sixth cutting blades 82 and the seventh cutting blades 84 are arranged parallel in the circumferential direction. In required regions in the axial direction of the sixth cutting blades 82 and the seventh cutting blades 84, working parts (indicated with "a" attached to the end of the numeral representing each cutting blade), which protrude diametrically outwardly and whose leading ends are sharp, are formed continuously in the axial direction.

Figure 8:
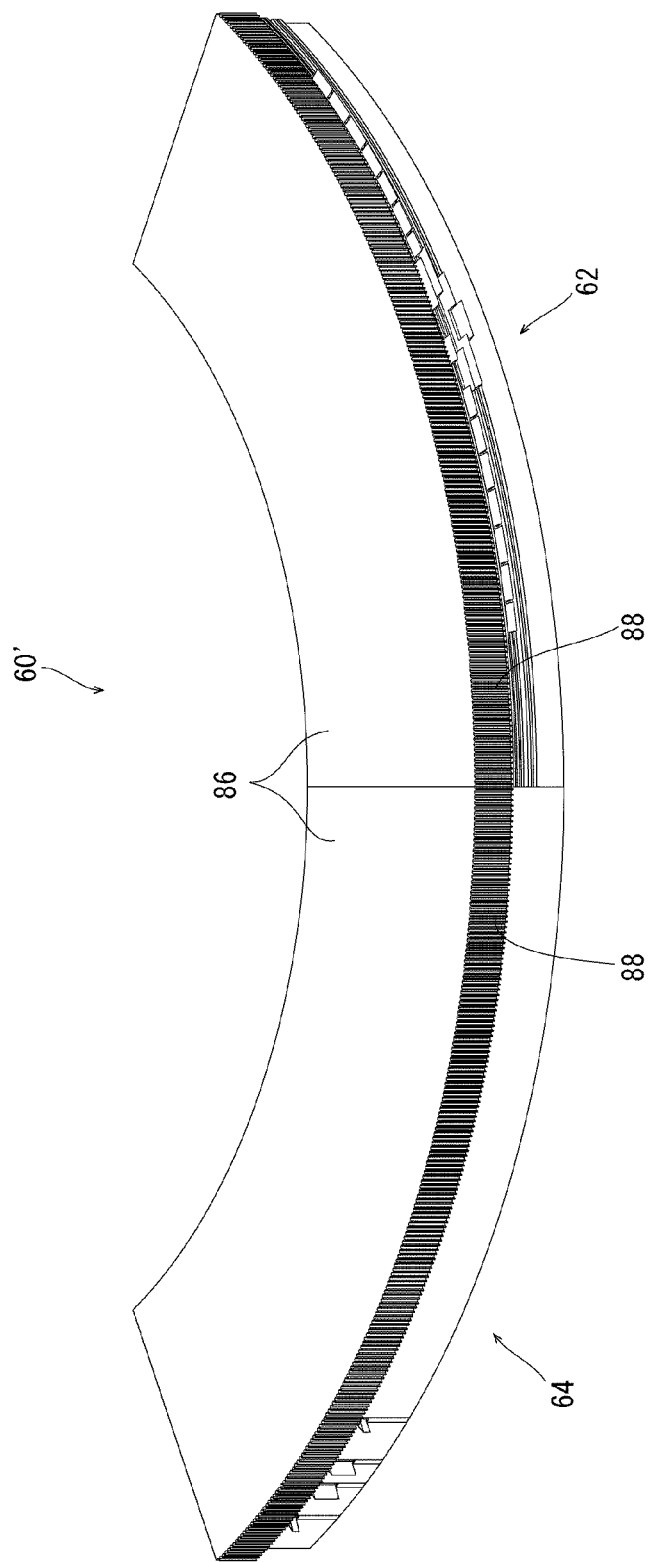
FIG. 8 is a perspective view showing a modification of the post-processing apparatus for manufacturing the container lid shown in FIG. 1.

The first cutting tool 62 and the second cutting tool 64, as described above, are connected together in the circumferential direction. The above-mentioned incomplete container lid (not shown) is rotated on its own axis and revolved round the first and second cutting tools 62, 64 along their outer peripheral surfaces. As a result, the first scores 26 (breakable line 22) to the seventh scores are formed, as required, in the incomplete container lid. As a device for rotating the incomplete container lid on its own axis, while revolving it round the first cutting tool 62 and the second cutting tool 64, along their outer peripheral surfaces, there is one, for example, disclosed in JP-B-2-23313 whose patent application was filed, prior to the present application, by the present applicant and which was already patented. The above JP-B-2-23313 actively rotates the incomplete container lid on its own axis with the use of a separate driving means such as an electric motor. Instead, as shown in FIG. 8, there may be a configuration in which arcuate plate-shaped auxiliary members 86 are disposed on the upper surfaces of the first cutting tool 62 and the second cutting tool 64; and irregularities 88 are formed on the outer peripheral surface of the auxiliary member 86, so that while the incomplete container lid is being revolved round the first and second cutting tools 62, 64 by a suitable revolving means (not shown), the incomplete container lid is passively allowed to rotate on its own axis upon the engagement between the irregularities 18 already formed in the incomplete container lid and the irregularities 88 formed in the outer peripheral surfaces of the auxiliary members 86. In the foregoing processing device, the incomplete container lid rotates on its own axis and revolves round the first and second cutting tools 62, 64 along their outer peripheral edges, whereby the incomplete container lid is formed with suitable slits. Instead, each cutting blade may be adapted to protrude diametrically inwardly of the cutting tool, and the incomplete container lid may be configured to rotate on its own axis and revolve around the first and second cutting tools along their inner peripheral edges.

In the synthetic-resin container lid of the present invention, the breakable line, the second scores, the third scores, the fourth scores, the fifth score, and the sixth scores are formed respectively at predetermined positions. Thus, even after the mouth-neck portion of the container is unsealed, the whole of the container lid is not separated from the mouth-neck portion of the container, and the connection between the body and the tamper-evident bottom portion is maintained. Such a synthetic-resin container lid of the present invention can be manufactured by first molding an incomplete container lid of a comparatively simple shape, and then forming the breakable line, the second scores, the third scores, the fourth scores, the fifth score, and the sixth scores at required positions of the incomplete container lid, as post-processing. Since the incomplete container lid is of a relatively simple shape, it can be molded by compression molding as well as injection molding. Compared with injection molding, compression molding is capable of rapid molding. If the incomplete container lid is molded by compression molding, therefore, the synthetic-resin container lid of the present invention is manufactured very rapidly. Even when the incomplete container lid is molded by injection molding, the synthetic-resin container lid of the present invention is manufactured comparatively rapidly, because the structure of the incomplete container lid is itself relatively simple, so that the fluidity of the molten resin does not lower. Whichever of the molding methods is used to mold the incomplete container lid, moreover, the mold of a relatively simple shape is adopted. Hence, the manufacturing cost of the mold is curtailed, with the result that the manufacturing cost of the container lid is reduced.

EXPLANATIONS OF LETTERS OR NUMERALS

2: Container lid
4: Body
6: Tamper-evident bottom portion
8: Top panel wall
10: Skirt wall
20: Internal thread
22: Breakable line
24: Specific region
26: First score
30: Second score
32: Third score
34: Fourth score
36: Fifth score
38: Sixth score
40: Seventh score
60: Post-processing apparatus
62: First cutting tool
64: Second cutting tool

The invention claimed is:

1. A synthetic-resin container lid which is applied to a container formed with an external thread, and a locking jaw section located below the external thread, on an outer peripheral surface of a mouth-neck portion, the synthetic-resin container lid comprising:

a body having a top panel wall, and a cylindrical skirt wall extending downward from a peripheral edge of the top panel wall, an inner peripheral surface of the skirt wall being formed with an internal thread to be screwed to the external thread; and a cylindrical tamper-evident bottom portion which is connected to the skirt wall via a breakable line extending in a circumferential direction, the cylindrical tamper-evident bottom portion having an inner peripheral surface where a plurality of arcuate locking pieces formed at intervals in the circumferential direction or an annular locking piece which extends continuously in the circumferential direction is disposed, the plurality of arcuate locking pieces or the annular locking piece being locked to the locking jaw section, wherein the breakable line is defined by forming a plurality of first scores extending in the circumferential direction at intervals in the circumferential direction, or by forming a groove continuously in the circumferential direction to reduce a residual thickness, except for a specific region extending in the circumferential direction, a pair of second scores extending in the circumferential direction at an interval in the circumferential direction in a lower part of the skirt wall; a pair of third scores extending in the circumferential direction at an interval in the circumferential direction in an upper part of the cylindrical tamper-evident bottom portion; a pair of fourth scores extending in the circumferential direction at an interval in the circumferential direction in the cylindrical tamper-evident bottom portion axially below the pair of the third scores; and a fifth score extending in the circumferential direction in the cylindrical tamper-evident bottom portion axially below the pair of the third scores are formed in the specific region, and an inner end of each of the pair of the third scores is located circumferentially outside an inner end of each of the pair of the second scores; an outer end of each of the pair of the third scores is located circumferentially outside an outer end of each of the pair of the second scores;

an inner end of each of the pair of the fourth scores is located circumferentially inside the inner end of each of the pair of the third scores; and each of both ends of the fifth score is located in alignment with, or circumferentially outside, the inner end of each of the pair of the second scores and the inner end of each of the pair of the fourth scores, and a pair of sixth scores extending in an axial direction is further formed in the specific region, the pair of the sixth scores connecting inner end parts of each of the pair of the second scores, connecting inner end parts of the pair of the fourth scores, and both end parts of the fifth score.

2. The synthetic-resin container lid according to claim 1, wherein
the breakable line is defined by forming the plurality of first scores extending in the circumferential direction at intervals in the circumferential direction, except for the specific region.

3. The synthetic-resin container lid according to claim 1, wherein
the fifth score is located axially below the pair of the fourth scores.

4. The synthetic-resin container lid according to claim 3, wherein
- the inner end of each of the pair of the second scores and the inner end of each of the pair of the fourth scores are located in alignment, and
  - each of the both ends of the fifth score is located circumferentially outside the inner end of each of the pair of the second scores and the inner end of each of the pair of the fourth scores.

5. The synthetic-resin container lid according to claim 1, wherein
- each of the pair of the third scores is located in axial alignment with the breakable line, and
- the outer end of each of the pair of the third scores is directly connected to the breakable line.

6. The synthetic-resin container lid according to claim 1, wherein
- seventh scores extending axially, which connect outer end parts of each of the pair of the third scores to the breakable line, are further formed in the specific region.

7. A method for manufacturing the synthetic-resin container lid according to claim 1, comprising:
- an incomplete container lid molding step of compression molding or injection molding an incomplete container lid of a shape having none of the breakable line, the pair of the second scores, the pair of the third scores, the pair of the fourth scores, the fifth score, and the pair of the sixth scores formed therein; and
- a post-processing step of applying cutting blades to the incomplete container lid, after the incomplete container lid molding step, to form the breakable line, the pair of the second scores, the pair of the third scores, the pair of the fourth scores, the fifth score, and the pair of the sixth scores.

8. The method according to claim 7, wherein
in the post-processing step, the incomplete container lid is allowed to revolve around an arcuate cutting tool, while rotating on an axis thereof, along an outer peripheral edge or an inner peripheral edge of the arcuate cutting tool having the cutting blades arranged on the outer peripheral edge or the inner peripheral edge.

9. A post-processing apparatus for executing the post-processing step in the method according to claim 7, comprising:
- a first cutting tool constituted by a stack of a first cutting blade of an arcuate plate shape for forming the breakable line; a second cutting blade of an arcuate plate shape for forming the pair of the second scores; a third cutting blade of an arcuate plate shape for forming the pair of the third scores; a fourth cutting blade of an arcuate plate shape for forming the pair of the fourth scores; and a fifth cutting blade of an arcuate plate shape for forming the fifth score; and
- a second cutting tool having sixth cutting blades arranged therein for forming the pair of the sixth scores,
- wherein the first cutting tool and the second cutting tool are connected together in a circumferential direction.

10. A post-processing apparatus for executing the post-processing step in the method according to claim 7, comprising:
- a first cutting tool constituted by a stack of a first cutting blade of an arcuate plate shape for forming the breakable line; a second cutting blade of an arcuate plate shape for forming the pair of the second scores; a third cutting blade of an arcuate plate shape for forming the pair of the third scores; a fourth cutting blade of an arcuate plate shape for forming the pair of the fourth scores; and a fifth cutting blade of an arcuate plate shape for forming the fifth score; and
- a second cutting tool having sixth cutting blades arranged therein for forming the pair of the sixth scores,
- wherein the first cutting tool and the second cutting tool are connected together in a circumferential direction,
- wherein seventh scores extending axially, which connect outer end parts of each of the third scores to the breakable line, are further formed in the specific region, and wherein seventh cutting blades for forming the seventh scores are also arranged in the second cutting tool.

* * * * *